US012223879B2

(12) United States Patent
Li et al.

(10) Patent No.: US 12,223,879 B2
(45) Date of Patent: Feb. 11, 2025

(54) MICRO DISPLAY CONTROLLING SYSTEM

(71) Applicant: JADE BIRD DISPLAY (SHANGHAI) LIMITED, Shanghai (CN)

(72) Inventors: Qiming Li, Shanghai (CN); Jing Ju, Shanghai (CN); Hongyun Liu, Shanghai (CN); Chunming Li, Shanghai (CN)

(73) Assignee: JADE BIRD DISPLAY (SHANGHAI) LIMITED, Shanghai (CN)

( * ) Notice: Subject to any disclaimer, the term of this patent is extended or adjusted under 35 U.S.C. 154(b) by 0 days.

(21) Appl. No.: 18/605,873

(22) Filed: Mar. 15, 2024

(65) Prior Publication Data
US 2024/0221591 A1    Jul. 4, 2024

Related U.S. Application Data

(63) Continuation of application No. PCT/CN2021/119347, filed on Sep. 18, 2021.

(51) Int. Cl.
*G09G 3/20* (2006.01)
*G06F 3/14* (2006.01)
*G09G 3/32* (2016.01)

(52) U.S. Cl.
CPC ......... *G09G 3/2092* (2013.01); *G06F 3/1446* (2013.01); *G09G 3/32* (2013.01); *G09G 2310/0286* (2013.01); *G09G 2320/02* (2013.01); *G09G 2340/0435* (2013.01); *G09G 2360/02* (2013.01); *G09G 2360/12* (2013.01); *G09G 2370/00* (2013.01)

(58) Field of Classification Search
None
See application file for complete search history.

(56) References Cited

FOREIGN PATENT DOCUMENTS

| CN | 102446490 A | 5/2012 |
| CN | 105825800 A | 8/2016 |
| CN | 109036153 A | 12/2018 |
| CN | 112567329 A | 3/2021 |
| JP | 2005055825 A | 3/2005 |

OTHER PUBLICATIONS

International Search Report and Written Opinion in PCT Application No. PCT/CN2021/119347 dated May 20, 2022.

*Primary Examiner* — Nicholas J Lee
(74) *Attorney, Agent, or Firm* — FINNEGAN, HENDERSON, FARABOW, GARRETT & DUNNER LLP

(57) ABSTRACT

A micro display controlling system includes a data interface, a data decoder, a memory-write controller, a frame-memory controller including at least two frame memories, at least one color-display panel, a data processor including at least two data formatting processors, and a data output interface including at least two sub-output interfaces.

10 Claims, 3 Drawing Sheets

MICRO DISPLAY CONTROLLING SYSTEM

CROSS-REFERENCE TO RELATED APPLICATION

This is a continuation application of International Application No. PCT/CN2021/119347, filed Sep. 18, 2021.

DESCRIPTION

Technology Field

The disclosure relates to a micro display controlling system.

Background

A light emitting diode (LED), which is a kind of semiconductor diode, can convert electrical energy into optical energy, and emit light in a different gray scale depending on a material of a light emitting layer included in the LED.

Digital display technology has become one of the largest branches in the field of modern electronics and optoelectronics and generates demands in various applications where an image forming function is needed. Among those applications, a micro-LED display, which has the potential of generating an image with better contrast, within shorter response times, with more energy efficiency, and with higher refresh rate is of interest.

Nowadays, wearable devices, including smart wearable devices, sometimes require a mini display screen on the device. Compared to traditional electronic devices having a screen, these smart wearable devices (such as, a smart watch, a smart phone, an augmented reality headset, etc.) require the screen to be smaller in size, to respond to a user's control more quickly, to use as little energy as possible, and to provide a higher refresh rate so that the device does not emit excessive heat, can last longer, and can produce better quality images. Therefore, a high-contrast, quick-response, energy-efficient, and higher refresh rate screen for wearable devices is in demand.

In an LED system, a back plane and power source combination determines size, brightness and contrast, and energy efficiency of the LED system. In a conventional LED system, the back plane and power source combination is bulky and introduces energy loss into the system, which may cause the LED system to not provide sufficient brightness and contrast or refresh rate. Such a system is not suitable for wearable devices because of these deficiencies. An improved LED system for wearable devices is needed.

SUMMARY

In accordance with present disclosure, there is provided a micro display controlling system. The system includes a data interface configured to provide image data; a data decoder, coupled to the data interface, to receive and decode the image data as single-color data frame; a memory-write controller configured to receive and restore the frame data from the data decoder; a frame-memory controller, including at least two frame memories, each configured to receive a different one of the single-color data frame from the memory-write controller, wherein a first frame memory configured to receive and store, from the memory-write controller, a first single-color data frame corresponding to a first color, and a second frame memory configured to received and store, from the memory-write controller, a second single-color data frame corresponding to a second color; at least one color-display panel; a data processor, including at least two data formatting processors, each data formatting processor is further configured to process the single-color data frame and provide a panel controlling signal and processed frame data, wherein each panel controlling signal is configured to control the color-display panel; and a data output interface, comprising at least two sub-output interfaces, each coupled to one of the data formatting processors, wherein the data formatting processors provides the panel controlling signal and the processed frame data to the output interface, the output interface further providing the panel controlling signal and the processed frame data to the color display panel. In certain embodiment, the number of the data formatting processors is the same as the number of the frame memories.

DESCRIPTION OF THE EMBODIMENTS

Hereinafter, embodiments consistent with the disclosure will be described with reference to the drawings. Wherever possible, the same reference numbers will be used throughout the drawings to refer to the same or like parts.

As discussed above, a conventional LED back plane system for wearable devices is bulky and introduces energy loss into LED systems. As a result, the conventional LED back plane system is not suitable for wearable devices because a wearable device requires the system to be relatively small in size, to produce sufficient brightness and contrast for a user, to be energy efficient, and to provide a sufficient refresh-rate for the screen.

Consistent with embodiments of the present disclosure, a micro LED back plane system includes an LED array suitable for wearable devices and a combination of a data processor and color display panel that is smaller in size. This ensures the micro LED display system can be smaller in size than a conventional LED display, produce steady light with sufficient brightness and contrast, be energy efficient, and provide a sufficient refresh-rate for the screen.

Some embodiments consistent with the present disclosure include a micro display controlling system, including a data interface, a data decoder, a memory-write controller, a frame-memory controller, at least one color-display panels, a data processor, a data output interface, and at least one sensor. A micro display device applying micro display controlling system generates an image with better contrast, within shorter response times, with more energy efficiency, and with a higher refresh-rate. A display module includes a display control, a pixel driver array, and a single-color display panel. Consistent with some embodiments, the display control includes a data receiver, a scan controlling signal processor, a shift register, a register controller, a row driver, and a column driver. The micro display controlling system consistent with disclosed embodiments is capable of overcoming the drawbacks of conventional micro display controlling systems, including micro LED controlling systems.

Figure 1:
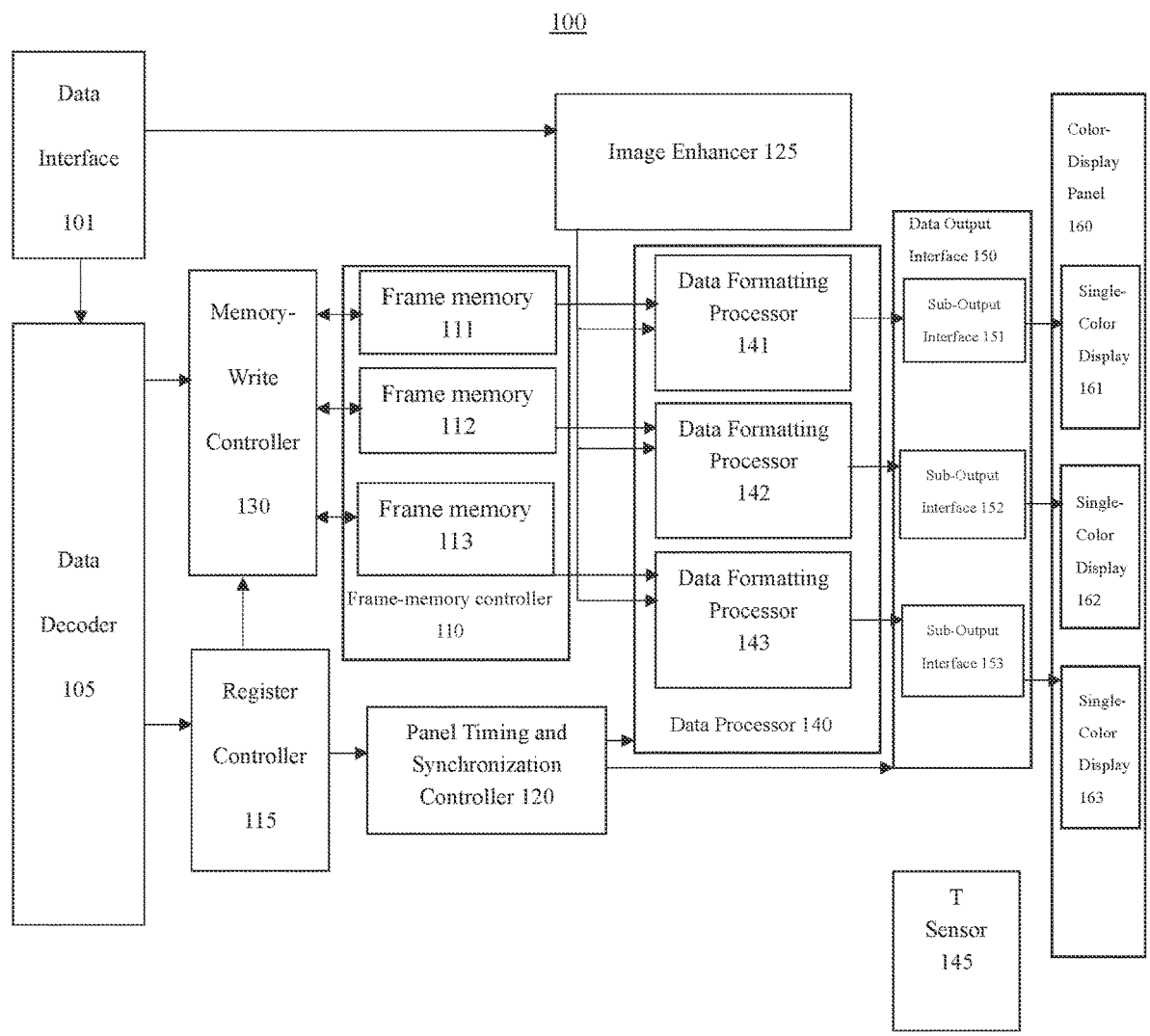
FIG. 1 is a schematic block diagram of an exemplary micro display control system for an LED display device, according to an exemplary embodiment of the present disclosure.

FIG. 1 is a schematic block diagram of an exemplary micro display controlling system 100 for an LED display device consistent with embodiments of the present disclosure. The micro display controlling system 100 includes a data interface 101 and a data decoder 105. In some embodiments, the data interface 101 and the data decoder 105 can both be provided as information exchange or decoding components such as installed software, internal hardware, or a peripheral device. The micro display controlling system 100 further includes a memory-write controller 130 coupled to the data decoder 105. The micro display controlling system 100 also includes a register controller 115 and a frame-memory controller 110. The register controller 115 is coupled between the data decoder 105 and the memory-write controller 130. The frame-memory controller 110 includes frame memories 111, 112, and 113. In some embodiments, the memory-write controller 130, the register controller 115, and the frame-memory controller 110 are provided as a portion of a random-access memory ("RAM") of the micro display controlling system 100.

The micro display controlling system 100 further includes a data processor 140. The data processor 140 includes data processing and formatting modules 141, 142, and 143. The data processor 140 is coupled to the frame-memory controller 110. The frame memories 111, 112, and 113 of the frame-memory controller 110 are coupled to the data processing and formatting modules 141, 142, and 143 of the data processor 140, respectively. In some embodiment, the data processor 140, as well as the data processing and formatting modules 141, 142, and 143, are installed with programs capable of conducting image processing.

The micro display controlling system 100 also includes a panel timing and synchronization control module 120 coupled between the register controller 115 and the data processor 140. In some embodiments, the panel timing and synchronization control module 120 is provided as a portion of the RAM of the micro display controlling system 100. The micro display controlling system 100 also includes a data output interface 150. The data output interface 150 is coupled to the data processor 140. The data output interface 150 further includes sub-output interfaces 151, 152, and 153. In some embodiments, the data output interface 150, as well as the sub-output interfaces 151, 152, and 153, can be provided as an information exchange component such as installed software, internal hardware, or a peripheral device.

The micro display controlling system 100 also includes a color-display panel 160 coupled to the data output interface 150. The color-display panel 160 further includes single-color display modules 161, 162, and 163. In some embodiments, the color-display panel 160, as well as the display modules 161, 162, and 163 can be LED display systems provided as sets of integrated LED circuits, chips, microchips, screens, or other electronic components or devices configurable to display graphical and frame data.

The micro display controlling system 100 further includes one or more sensors 145. In some embodiments, the one or more sensors 145 include a temperature sensor configured to detect temperature of the micro display controlling system 100. Each such temperature sensor detects and monitors temperature of the micro display controlling system 100 and provide the detected temperature value to a general purpose computer to which the micro display controlling system 100 is coupled. The general purpose computer can shut down power if the temperature of the micro display controlling system 100 reaches a threshold value, such as 80 degree Celsius, or any temperature that is preset by the user, the manufacture, or that meets industrial standards of LED system manufacture.

Consistent with the present disclosure, the data interface 101 is configured to receive and provide data for the micro display controlling system 100. Specifically, the data interface 101 receives raw image data, converts the raw image data it receives into frame data, and provides the frame data to the data decoder 105.

In some embodiments, the data interface 101 receives image data input from an image data providing electronic device inside or outside of the micro display controlling system 100. For example, the data interface 101 may receive raw image data, pre-processed frame data, or both, from a ROM, a hard drive, or from a peripheral device such as a camera, a video recording device, a portable driver, a USB driver, a touch screen, or other device generating raw image data. The raw image data can be raster graphics data, vector image data, video data, or other forms of image data that are currently, or may become, available. In some embodiments, the data interface 101 connects with an external data-providing device through a physical connection, such as through an electronic cable. In some embodiments, the data interface 101 connects with the peripheral device wirelessly, such as through a Wi-Fi or a BLUETOOTH™ connection. In some embodiments, the data interface 101 processes the received raw image data to produce sets of corresponding frame data. In some embodiments, the data interface 101 stores decoding software and includes a processor that executes the software to process the raw image data. In some embodiments, the data interface 101 is coupled to the data decoder 105. More specifically, when the image data is in video format, the data interface 101 provides the image data to data decoder 105. The data decoder 105 includes decoding software/hardware or other software/hardware that are currently available or may become available, to process the image data and provides the processed image data as frame data. In some embodiments, the data decoder 105, samples the video format image data, e.g., using a periodic sampling method, and creates sets of graphic format data and clock signal data corresponding to the video format image data. In some embodiment, the sampling interval is equal to or less than ¹⁄₂₄ second. In some embodiments, the sampling method can be interpolation, polling, convolution, deconvolution, or other methods of video format image data sampling that are currently, or may become, available. More specifically, when the raw image data is vector graphic data, the data decoder 105 converts the sets of vector graphic data into sets of raster graphic image data, or an LED-display-friendly dot matrix data structure that is currently, or may become, available.

In some embodiments, the data decoder 105 outputs the processed frame image data in a form suitable for LED display. For example, in some embodiments, the data decoder 105 further provides and stores, in decoder 105, the processed frame data as at least two single-color data frames, each single-color data frame corresponds to a color channel. In some embodiments, the single-color data frame is provided as three single-color channels, i.e. a red color channel, a green color channel, and a blue color channel, commonly known as the RGB layers or RGB channels. Each pixel of the processed frame data is provided as a pixel data point that includes three 8-bit color scale values (i.e. a red scale value, a green scale value, and a blue scale value) and each value corresponds to the color scale value of the pixel in one of the three (RGB) color channels/layers. In some embodiments, each frame of the processed frame data is stored as one multi-dimensional matrix including the pixel data points of each pixel of the processed frame data. The raw image, such as a video clip, usually is large in size and cannot be displayed efficiently on a micro LED display on a smart wearable device. By providing the raw image data as multi-layer single-color data frame, such as the RGB layers, the processed frame data is smaller in size and more suitable for micro LED display on a smart wearable device to process and to display.

In some embodiments, the at least two single-color data frames are captured or provided by the data interface 101. In some embodiments, an image enhancer 125, coupled to the data interface 101, produces luminance adjustment data by processing the frame data received from data interface 101 pixel by pixel. In some embodiments, the image enhancer 125 stores luminance adjustment software and includes a processor that executes the software to process the frame data. The processing by the image enhancer 125, in some embodiments, includes brightening or dimming certain pixels by increasing or decreasing luminance of that pixel. The change of pixel luminance is stored as the luminance adjustment data. The image enhancer 125 transmits the luminance adjustment data to a data processor 140.

In some embodiments, the at least two single-color data frame is provided as CMY (i.e. cyan, magenta, and yellow) layers/channels, YUV (luminance, chrominance, and chroma) layers/channels, HSV (hue saturation value) layers/channels, or other color layers/channels that are currently available or may become available, to process the frame data and provide the processed frame image data as multiple layers/channels. In some embodiments, a color channel is also referred to as a raster band. In some embodiments, the data decoder 105 further transmits the single-color data frames to the memory-write controller 130.

More particularly, in some embodiments, the memory-write controller 130 receives frame data from the data decoder 105 one frame at a time. In some embodiments, the memory-write controller 130 receives the at least two single-color data frames in chronological order. In some other embodiments, the memory-write controller 130 receives the at least two single-color data frames in the order that the frame data is stored in a storage medium connected to the data decoder 105. More specifically, the frame data received by the memory-write controller 130 can be frame data converted from raw image data by the data decoder 105, or image data received by the data decoder 105 in frame data format. In some embodiments, the data interface 101 directly connects to the memory-write controller 130.

Still with reference to FIG. 1, in some embodiments, the memory-write controller 130 includes an image enhancement component. The image enhancement component is programmed to process the frame data received from the data decoder 105. In some embodiments, the programming causes the image enhancement component to accentuate, or sharpen, image features of the image represented by the raw image data, such as edges of a specific shape in the image, boundaries between different areas in the image, or color contrast, not only to restore lost graphical information and remove graphical noise created during the process of raw data converting to frame data, but also to format the graphic display to be more suitable for LED display. In some embodiments, the image enhancement component is a chip, a microprocessor, or a graphic processing unit ("GPU") that is programmed to perform the image enhancement.

In some embodiments, memory-write controller 130 receives the at least two single-color data frames, such as the three single-color (red, green, and blue) data frames, from data decoder 105. In some embodiments, the memory-write controller 130 outputs the single-color data frames to the frame-memory controller 110, one by one.

In the embodiment depicted in FIG. 1, the frame-memory controller 110 receives the three single-color data frames and provides to each one of the frame memories 111, 112, and 113 a different one of the single-color data frames.

Consistent with the present disclosure, the data processor 140, coupled to the frame-memory controller 110, receives the single-color data frames from the frame-memory controller 110. More specifically, in the embodiment depicted in FIG. 1, three data formatting processors 141, 142, and 143 of the data processor 140, are coupled to receive from the frame memories 111, 112, and 113 of the frame-memory controller 110, respectively, the single-color data frames. The data processing and formatting modules 141, 142, and 143 are each programmed to process the received single-color data frames and create a display panel controlling signal to transmit to the data output interface 150.

In some embodiments not shown in the figures, the frame-memory controller 110 receives the three single-color data frames and provides the single-color data frames only to the frame memories 111 and 112. The data formatting processors 141, 142, and 143 of the data processor 140, are coupled to receive from the frame memories 111 and 112 of the frame-memory controller 110, respectively, the three single-color data frames.

In the embodiment depicted in FIG. 1, the data output interface 150 includes three sub-output interface 151, 152, and 153, each coupled to receive the single-color data frames from one of the three data processing and formatting modules 141, 142, and 143, respectively.

In some embodiments, the data processor 140 outputs the processed single-color data frames so that the single-color data frames can more accurately reflect the chronological order of each frame. In some embodiments, the data decoder 105 further provides the clock signal data corresponding to the video format image data to the register controller 115. The clock signal data is time series data generated by the data decoder 105 according to the time features of each frame in the raw image data. When the frame-memory controller 110 and the data processor 140 process and store the single-color data frames, some frames or some features may be lost during the process, such as chronological order and time interval features among frames. The register controller 115 provides the clock signal data to the panel timing and synchronization controller 120. The panel timing and synchronization controller 120, coupled to the data processor 140 and to the data output 150, includes a processor and is configured to synchronize time features, such as chronological order and time interval features among frames, of the processed single-color data frames stored in data processor 140 and the data output interface 150 with the clock signal data. By comparing the stored frame data to the clock signal data of the raw image data, the panel timing and synchronization control module 120 generates a panel controlling signal to sort the processed and stored image represented by the frame data, so that the frame data can better represent the time features in the raw image data, when displayed on the LED display.

In the embodiment depicted in FIG. 1, the color-display panel 160, coupled to the data output interface 150, includes three display modules 161, 162, and 163. The display modules 161, 162, and 163 of the color-display panel 160 each couple to and receive the single-color data frames from each one of the three sub-output interfaces 151, 152, and 153, respectively. In some embodiment, each one of the display modules 161, 162, and 163 comprises a display module as, for example, depicted in FIG. 2 and described more fully below.

Figure 2:
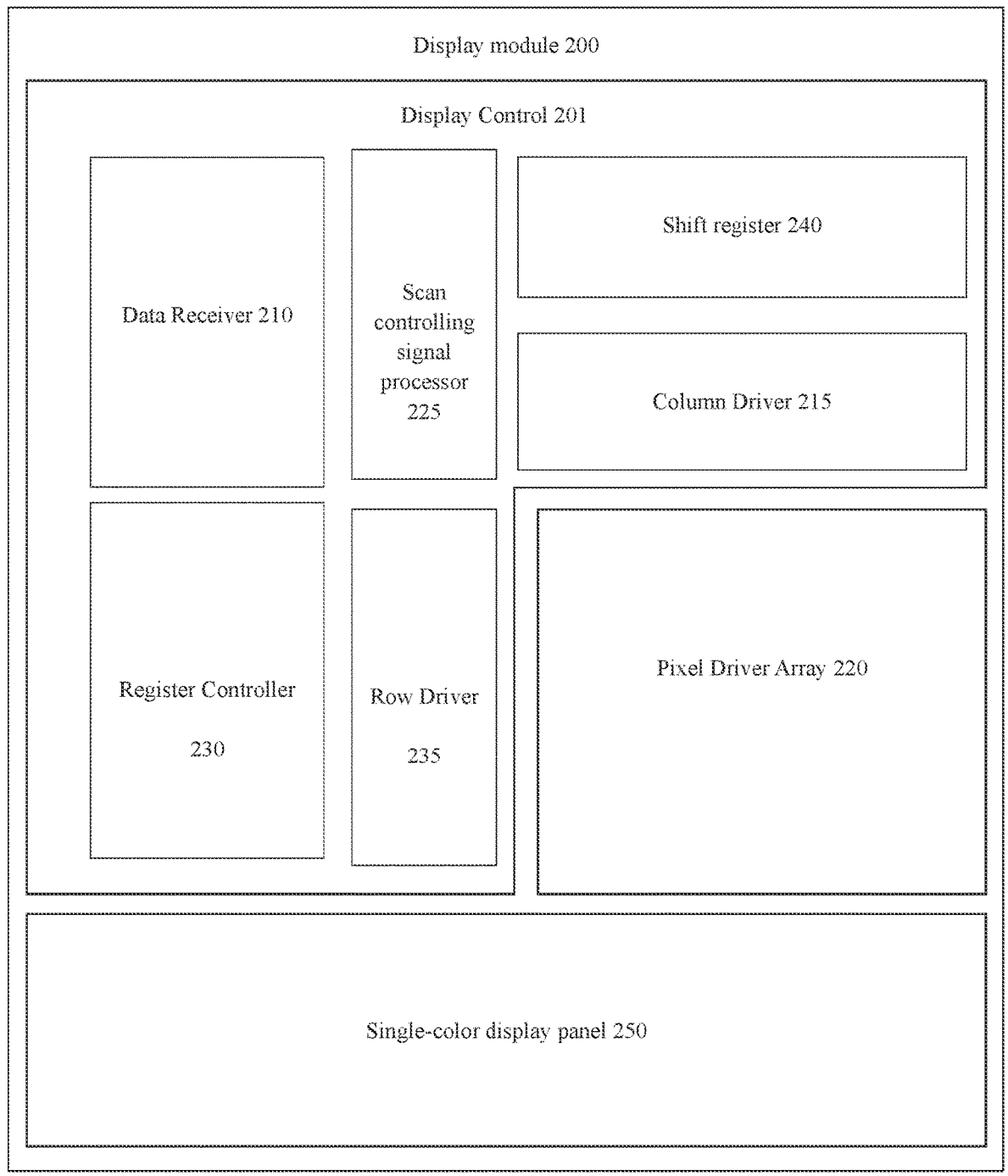
FIG. 2 is a schematic block diagram of a display module of the micro display control system, according to an exemplary embodiment of the present disclosure.

FIG. 2 is a schematic block diagram of an exemplary display module 200, consistent with embodiments of the present disclosure. The display module 200 includes a display control 201. In some embodiments, the display control 201 is coupled to a pixel driver array 220 and at least one single-color display panel 250, and is provided as an internal memory chip or circuit. The display control 201 further includes a data receiver 210, a column driver 215, a scan controlling signal processor 225, a register controller 230, a row driver 235, and a shift register 240. The data receiver 210 is coupled to the output interface 150 (FIG. 1) and receives a color layer of the processed single-color data frames from the output interface 150. The scan controlling signal processor 225, the shift register 240, and the register controller 230 are coupled to the data receiver 210. The row driver 235 and the column driver 215 are both coupled to the scan controlling signal processor 225 and the shift register controller 230. The pixel driver array 220 can be provided as a circuit, a chip, a microchip, or other electronic components or devices configurable to control pixels of an LED display. The single-color display panel 250 can be provided as sets of integrated LED circuits, chips, microchips, screens, or other optical or electronic components or devices configurable to display graphical and frame data.

Consistent with the present disclosure, the display control 201 is configured to receive and provide processed frame data for the display module 200. In the embodiment depicted in FIG. 1, the data receiver 210 receives processed frame data from one of the sub-output interfaces 151, 152, and 153 of the data output 150. In some embodiments, the data receiver 210 further receives the panel controlling signal, generated by the panel timing and synchronization control module 120, from the same one of the sub-output interfaces.

In some embodiments, the scan controlling signal processor 225 receives the processed, single-color data frame from one of the sub-output interfaces 151, 152, and 153 of the output interface 150. The scan controlling signal processor 225 further generates the single-color data frames as a column controlling signal and a row controlling signal. The scan controlling signal processor 225 further provides the column controlling signal to the column driver 215 and provides the row controlling signal to the row driver 235.

In some embodiments, the shift register 240 receives single-color data frames from the data receiver 210. The shift register 240 provides the received single-color data frame to the row driver 235 and the column driver 215. The register controller 230, coupled to the data receiver 210, receives both the one-color frame data and the panel controlling data generated by the panel timing and synchronization control module 120. In some embodiments, the register controller 230 is programmed to compare and update the time feature of the single-color data frames, such as the chronological order and the time interval among frames, with the clock signal data collected by the first register controller 115. In some embodiment, the register controller 230 is programmed to compare and update the time feature of the single-color data frames with the panel controlling signal received from the display control 201. In some embodiments, the register controller 230 produces the time-feature updated frame data by processing the frame data pixel by pixel. The processing by the register controller 230, in some embodiments, includes adding or subtracting certain values to the specific frame according to the clock signal data or the panel controlling signal.

In some embodiments, the column driver 215, as well as the row driver 235, are coupled to both the scan controlling signal processor 225 and the shift register 240. The column driver 215 receives the column controlling signal from the scan controlling signal processor 225. The row driver 235 receives the row controlling signal from the scan controlling signal processor 225.

Consistent with the present disclosure, the column driver 215, being coupled to the pixel driver array 220, controls image display by controlling pixel scanning by column. The row driver 235, being coupled to the pixel driver array 220, controls the image display by controlling pixel scanning by row. The pixel driver array 220 receives frame data from the column driver 215 and the row driver 235, together or separately. In some embodiments, the pixel driver array 220 is an integrated LED circuit.

In some embodiment, the pixel driver array 220 is further configured to control the single-color display panel 250. The single-color display panel 250 is further configured so that multiple single-color display panel 250 can be formed as an LED display device, for example, the color display panel 160 in FIG. 1. In some embodiments, the color-display panel 160 includes an image merger 300 configured to merge the at least two single-color data frames and create multi-color frame data suitable for display on the color-display panel 160.

Figure 3:
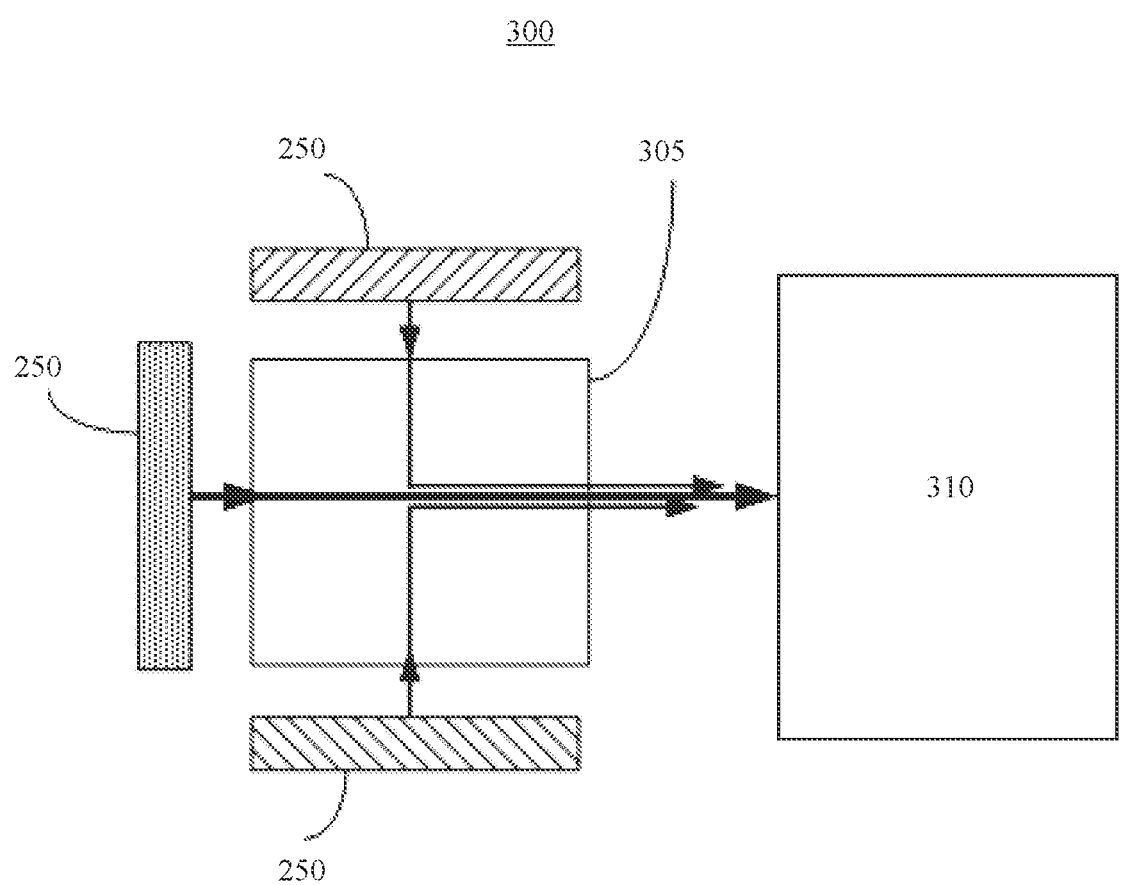
FIG. 3 is a schematic block diagram of an image merger of the micro display control system, according to an exemplary embodiment of the present disclosure.

FIG. 3 is a schematic block diagram of an exemplary image merger 300, consistent with embodiments of the present disclosure. In some embodiments, the image merger is provided as an optical image merger such as a square-shaped light combining prism 305. Each display modules 161, 162, and 163, through the respective single-color display panels 250, configured to emit single-color LED lights, provides the respective single-color data frames toward the square-shaped light combining prism 305 as three single-color frame images. The light combining prism 305 directs and projects the three single-color images toward the same direction, i.e., toward a screen of the color-display panel 160, combining the three single-color images as a multi-color image suitable for display. In some further embodiments, the color-display panel 160 includes an optical magnifier 310 configured to magnify the multi-color images so that the multi-color image is more suitable for display.

In some embodiments not shown in the figures, the image merger is provided as a digital frame data merger configured to receive the at least two single-color data frames from the data output interface 150 and combine the single-color data frames as multi-color frame data.

In some embodiments, multiple display module 200 depicted in FIG. 2 can be configured to form the color-display panel 160 depicted in FIG. 1.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A micro display controlling system, comprising:
 a data interface configured to provide image data;
 a data decoder, coupled to the data interface, to receive and decode the image data as single-color data frame;
 a memory-write controller configured to receive and restore the frame data from the data decoder;

a frame-memory controller, comprising:
  at least two frame memories, each configured to receive a different one of the single-color data frames from the memory-write controller, wherein a first frame memory configured to receive and store, from the memory-write controller, a first single-color data frame corresponding to a first color, and a second frame memory configured to received and store, from the memory-write controller, a second single-color data frame corresponding to a second color;
at least one color-display panel;
a data processor, comprising:
  at least two data formatting processors, each data formatting processor is further configured to process the single-color data frame and provides a panel controlling signal and processed frame data, wherein each panel controlling signal is configured to control the color-display panel; and
a data output interface, comprising at least two sub-output interfaces, each coupled to one of the data formatting processors, wherein each of the data formatting processors provides the panel controlling signal and the processed frame data to the output interface, the output interface further providing the panel controlling signal and the processed frame data to the color display panel.

2. The micro display controlling system according to claim 1, further comprising a register controller, coupled to the memory-write controller and the data interface and decoder, the register controller configured to receive clock signal data from the processed frame data.

3. The micro display controlling system according to claim 2, further comprising a panel timing and synchronization controller, coupled to receive the clock signal data from the first register controller, the panel timing and synchronization controller being configured to sort the processed frame data according to the clock signal data.

4. The micro display controlling system according to claim 3, wherein the panel timing and synchronization controller is coupled to the data processor and further configured to provide the processed frame data to the data processor in an order corresponding to the clock signal data.

5. The micro display controlling system according to claim 4, wherein the panel timing and synchronization controller is coupled to the at least one color-display panel and further configured to control data transmit timing of the at least one color-display panel.

6. The micro display controlling system according to claim 1, wherein the number of the data formatting processors is the same as the number of the frame-memories.

7. The micro display controlling system according to claim 1, the at least one color-display panel further comprising at least two display modules, the at least two display modules respectively coupled to the at least two sub-output interfaces, wherein, each of the display modules is further configured to receive the panel controlling signal and the processed frame data from the sub-output interface.

8. The micro display controlling system according to claim 7, the display module further comprising,
  a display control, coupled to the sub-output interface, configured to receive the panel controlling signal and the processed frame data from the sub-output interface;
  a pixel driver array, coupled to the display control, configured to receive the processed frame data corresponding to the panel controlling signal; and
  at least one micro light-emitting diode (LED) light,
  wherein the pixel driver array is configured to control the at least one micro LED light in the display panel, corresponding to the processed frame data and the panel controlling signal, to turn the at least one micro LED light on or off.

9. The micro display controlling system according to claim 8, wherein the display control comprising,
  a data receiver, coupled to the data output interface, to receive processed frame data from the data output interface;
  a scan controlling signal processor, coupled to the data receiver, to receive and convert the processed frame data into a column controlling signal and a row controlling signal;
  a shift register coupled to the data receiver to receive processed frame data from the data receiver, the shift register configured to provide the processed frame data to the column driver and the row driver;
  a second register controller coupled to the data receiver to receive the processed frame data and the data from the data receiver, the second register controller configured to verify a sort of the processed frame data according to the time series data;
  a row driver, coupled to both the scan controlling signal processer and the shift register, configured to receive the row controlling signal and provide a corresponding row pixel signal to the pixel driver array; and
  a column driver coupled to both the scan controlling signal processer and the shift register, configured to receive the column controlling signal and provide a correspond column pixel signal to the pixel driver array.

10. The micro display controlling system according to claim 1, wherein, the decoded single-color data frame comprises a single color in red, green, or blue.

* * * * *

UNITED STATES PATENT AND TRADEMARK OFFICE
CERTIFICATE OF CORRECTION

| | |
|---|---|
| PATENT NO. | : 12,223,879 B2 |
| APPLICATION NO. | : 18/605873 |
| DATED | : February 11, 2025 |
| INVENTOR(S) | : Qiming Li et al. |

Page 1 of 1

It is certified that error appears in the above-identified patent and that said Letters Patent is hereby corrected as shown below:

In the Claims

Claim 9, Column 10, Line 46, "correspond" should read as --corresponding--.

Signed and Sealed this
Thirtieth Day of September, 2025

John A. Squires
*Director of the United States Patent and Trademark Office*